US006981714B1

(12) United States Patent
Schell et al.

(10) Patent No.: US 6,981,714 B1

(45) Date of Patent: Jan. 3, 2006

(54) FEET FIRST FOOTREST

(76) Inventors: Teresa Diane Schell, 235 S. 20th St., Battle Creek, MI (US) 49015; James Drury Schell, 235 S. 20th St., Battle Creek, MI (US) 49015; James Lee Mullen, 11800 W. Drive N., Bellevue, MI (US) 49021

( * ) Notice: Subject to any disclaimer, the term of this patent is extended or adjusted under 35 U.S.C. 154(b) by 0 days.

(21) Appl. No.: 10/729,893

(22) Filed: Dec. 8, 2003

(51) Int. Cl.
*B62J 25/00* (2006.01)

(52) U.S. Cl. .................................................. 280/304.1

(58) Field of Classification Search ............. 280/304.1; 297/423.1, 423.2, 423.4
See application file for complete search history.

(56) References Cited

U.S. PATENT DOCUMENTS 3,863,984 A * 2/1975 Sickels .................. 297/423.17
4,093,306 A * 6/1978 Zitone ..................... 297/217.1
5,209,509 A * 5/1993 Gay et al. ................ 280/304.1
5,393,082 A * 2/1995 Fenley ....................... 280/291
5,401,045 A * 3/1995 Foerster et al. .......... 280/250.1
5,522,644 A * 6/1996 Peek ..................... 297/423.26
6,234,576 B1 * 5/2001 Fleigle .................. 297/423.37
6,648,417 B1 * 11/2003 Gilbert et al. ......... 297/423.25

* cited by examiner

*Primary Examiner*—Lesley D. Morris
*Assistant Examiner*—Paul Royal, Jr.

(57) ABSTRACT

The Feet First Footrest assembly is comprised of an outer rail, a carriage, a footrest arm a footrest, and clamps for attaching the outer rail to the wheelchair frame. The top end of the footrest arm is attached to the carriage with mounting hardware. The footrest is attached to the bottom end of the footrest arm by associated hardware. The carriage, with footrest arm and footrest attached, slides to the extended position and retracted position along the outer rail. In the extended position the footrest assembly locks in place to permit use when needed. In the retracted position, beneath the wheelchair seat, the wheelchair can be conventionally folded for storage or transportation.

10 Claims, 8 Drawing Sheets

FEET FIRST FOOTREST

BACKGROUND OF THE INVENTION

Figure 1:
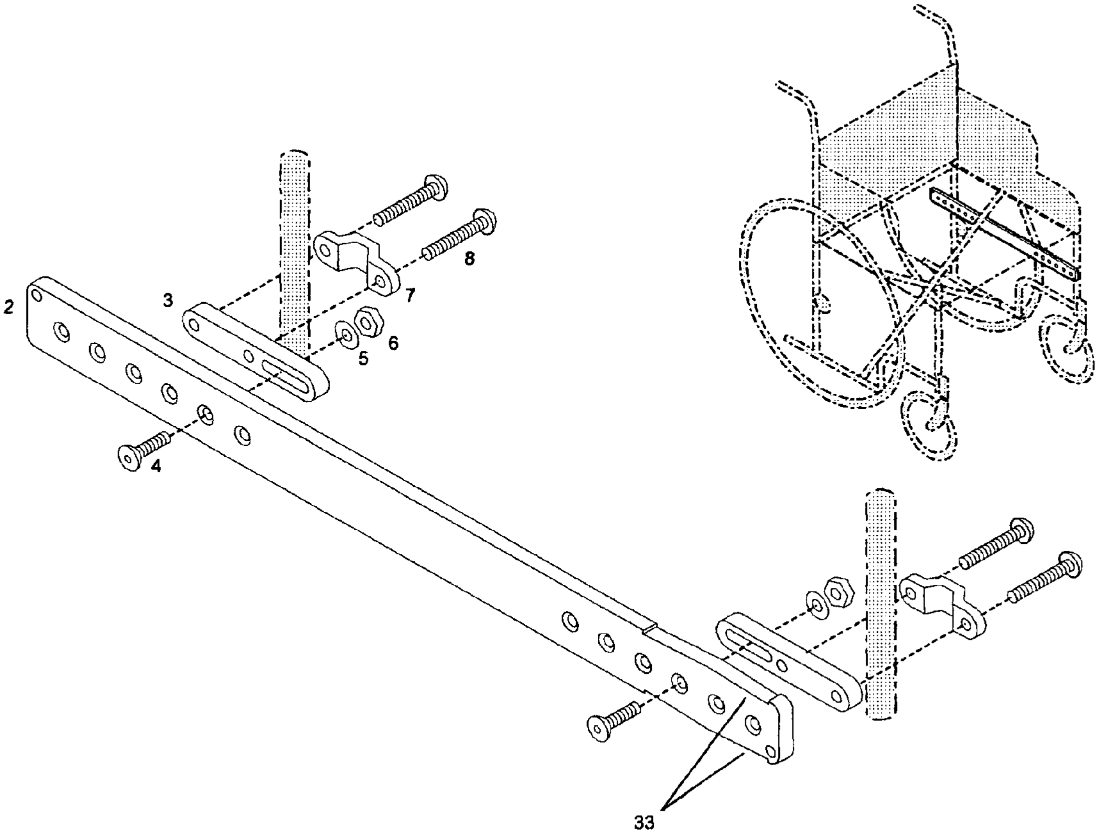

This invention relates in general to wheelchairs and, in particular, to wheelchair accessories. Most particularly, this invention relates to a footrest for wheelchairs. A constant effort is made to produce wheelchairs that are user friendly. Focus is drawn towards producing wheelchairs that are strong and durable yet portable and lightweight. Advancements in folding frame construction have led to wheelchairs that are more portable. Even advancements in the construction of footrest assemblies have rendered such assemblies easily movable relative to the wheelchair frame. Often, such assemblies are also easily detachable. Most usually, the footrest assemblies pivot from a position in front of the chair to a position beside the wheelchair.

When beside the wheelchair, the footrest assembly will not interfere with the user's ability to get into and out of the wheelchair. However, in this position, the footrest assembly could interfere with the ingress and egress of the wheelchair occupant in areas where a limited amount of space is available. To date, this problem has been addressed by removing the footrest assembly which results in the footrest assembly being lost or misplaced. Many wheelchair occupants do not need the use of a footrest assembly all of the time as they propel themselves with their feet. However, there are times when they are tired, or are being wheeled by someone else, that a footrest is desirable and necessary. In these cases what is needed is a simple, lightweight footrest assembly that can be retracted and stored in a position beneath the wheelchair seat when not needed, and quickly extended to the front of the wheelchair when needed.

SUMMARY OF THE INVENTION

This invention is directed towards a footrest assembly that meets all of the foregoing needs. It is easily retracted and stored, easily extended for use and will not interfere with ingress and egress in space limited areas. In addition, the footrest assembly, when retracted, permits the wheelchair to be folded for transportation and/or storage. The footrest assembly is comprised of a footrest arm, a footrest, a carriage and associated mounting hardware for mounting to the front and rear vertical posts of the wheelchair frame under the wheelchair seat. The footrest assembly can be pivoted upward to permit retraction without interference with the front caster wheel. This permits the assembly to be as compact as possible for retraction, storage and wheelchair folding. This invention is relatively simple. As those associated with wheelchair use can attest, footrests are essential for many users, but are not essential full time for others. In recognition of the use and need of footrests, this invention addresses all of the needs. It is available for use when needed, retracted and stored when not needed, and when retracted, does not interfere with the ability to fold the wheelchair for transportation and/or storage.

This design is simple. Parts in the invention have been designed to fit either side of a wheelchair; there are no right or left-hand parts. This reduces the complexity of manufacturing and assembly.

IDENTIFICATION OF FIGURES

Figure 2:
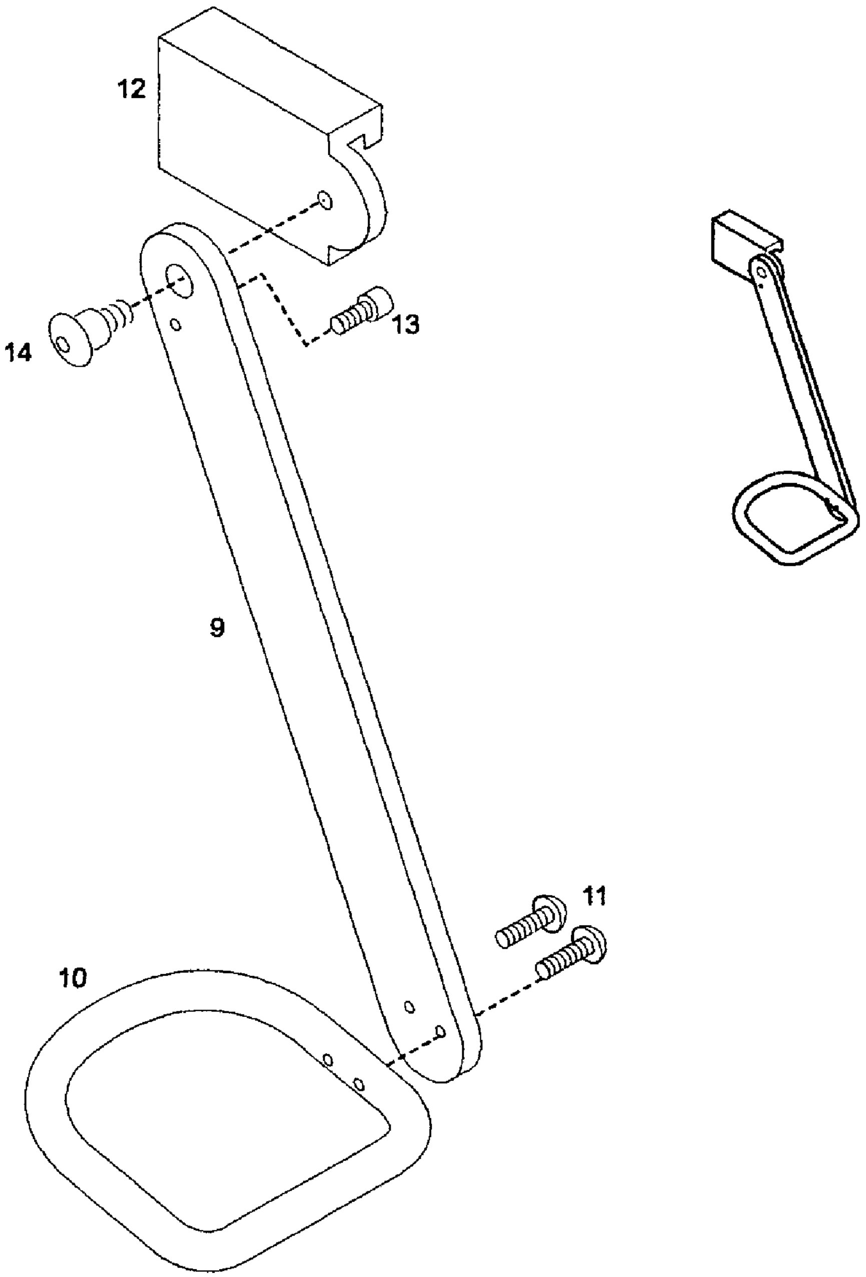
Figure 3:
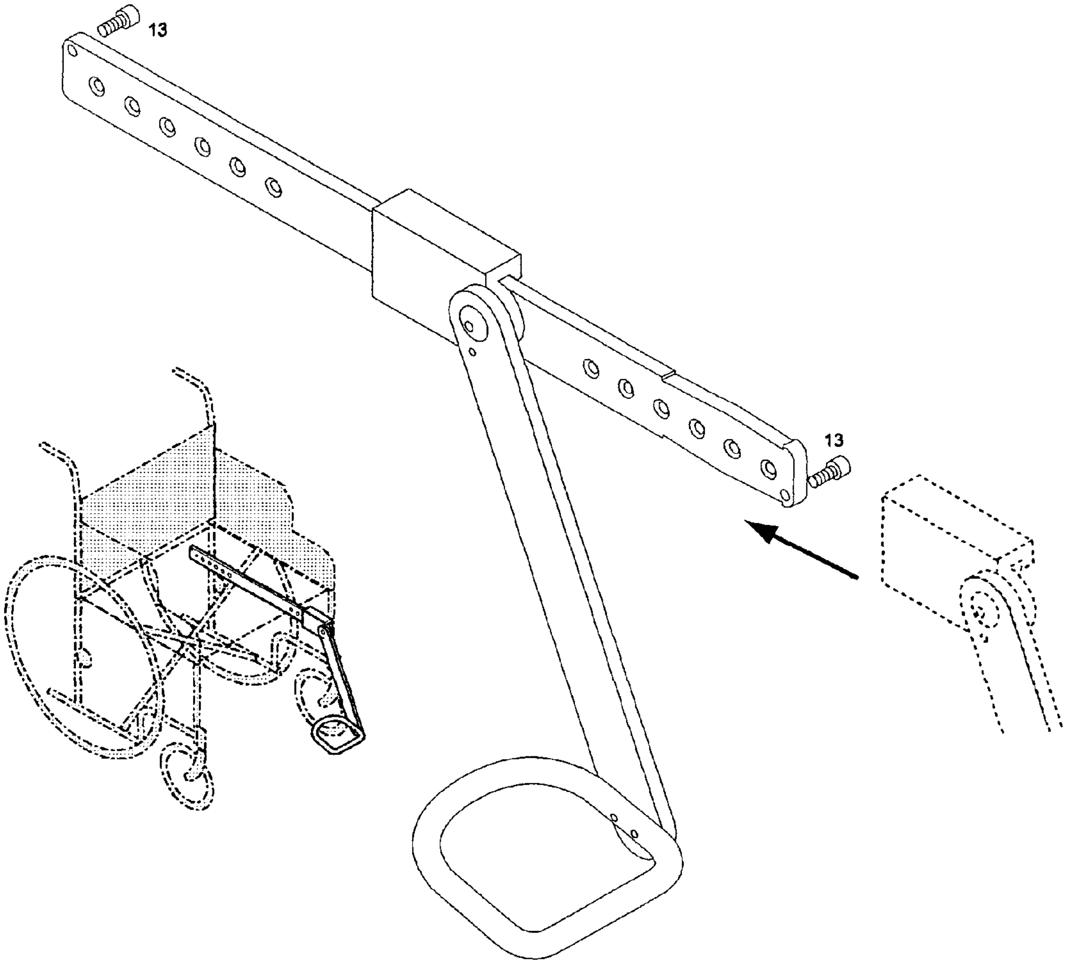
Figure 4:
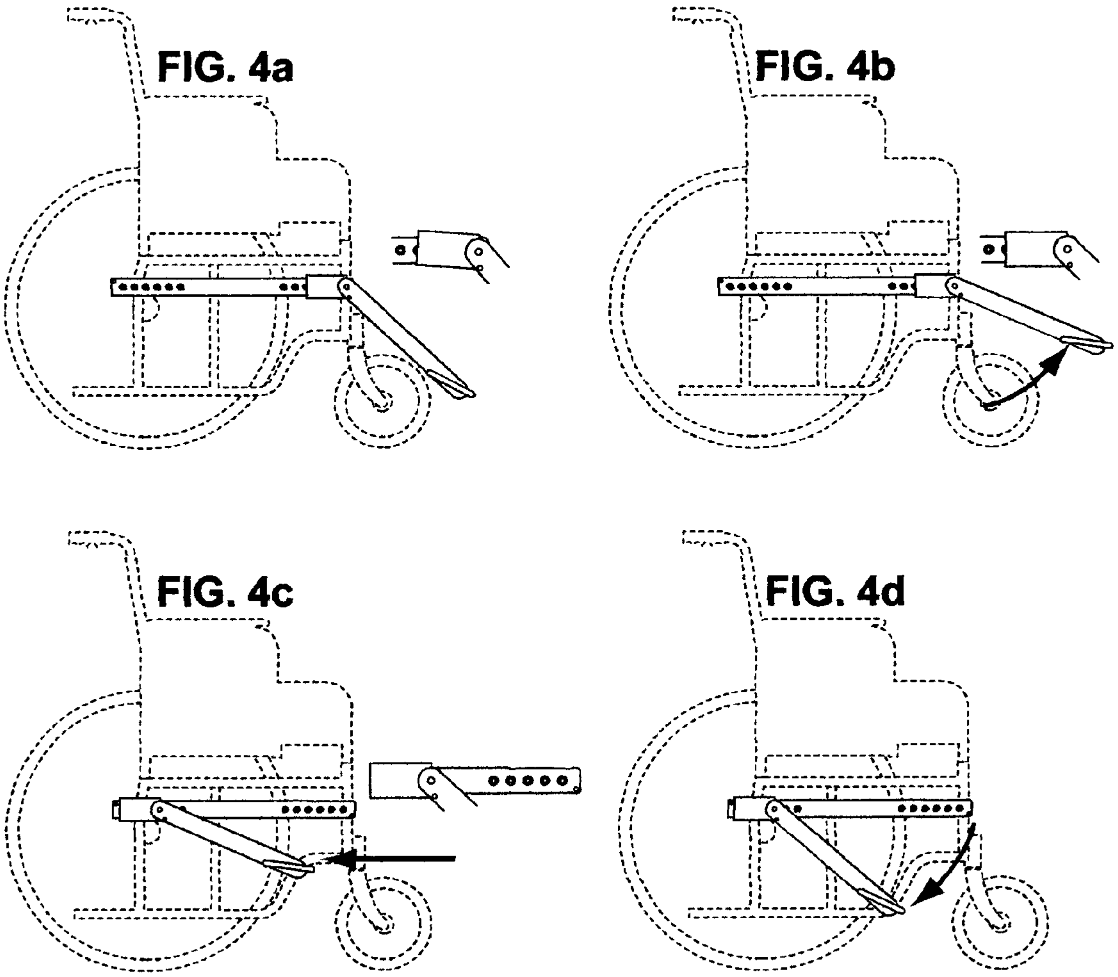
Figure 5:
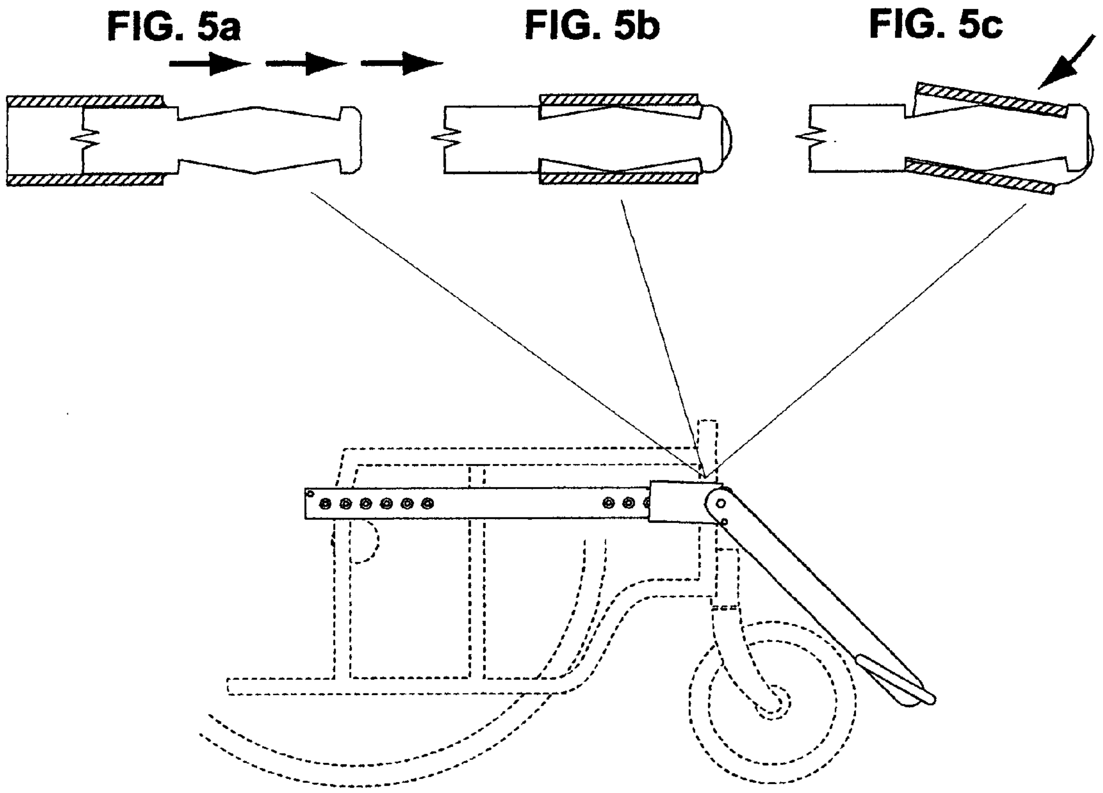
Figure 6A:
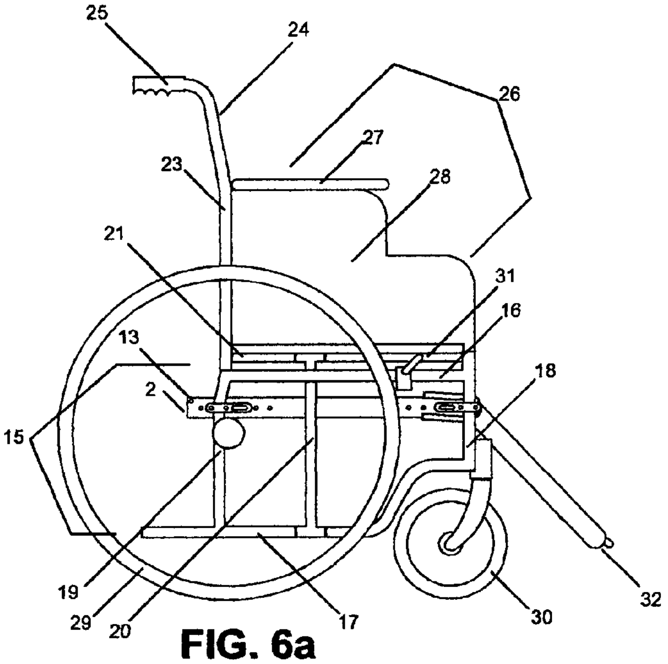
Figure 6B:
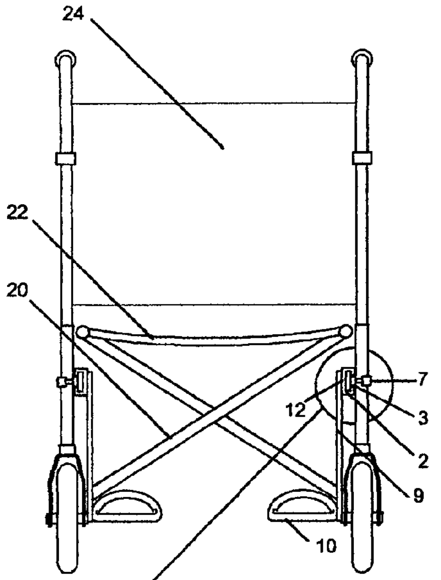
Figure 6:
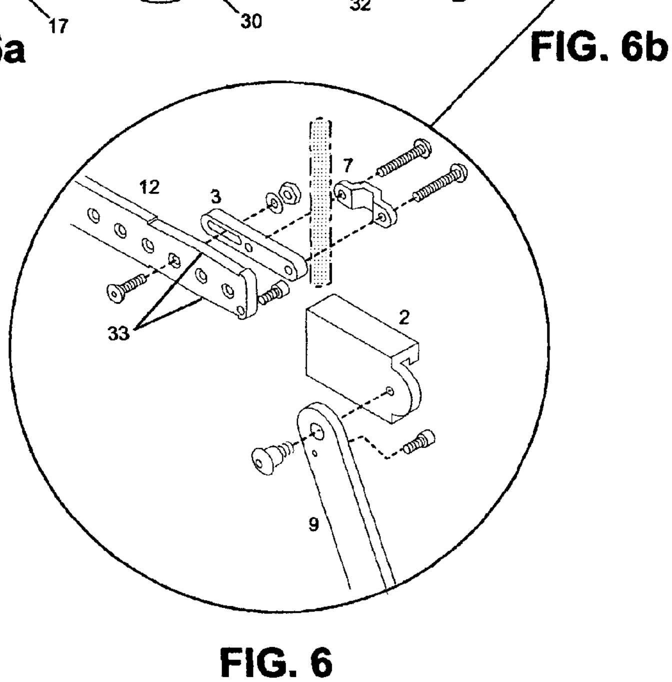
Figure 7:
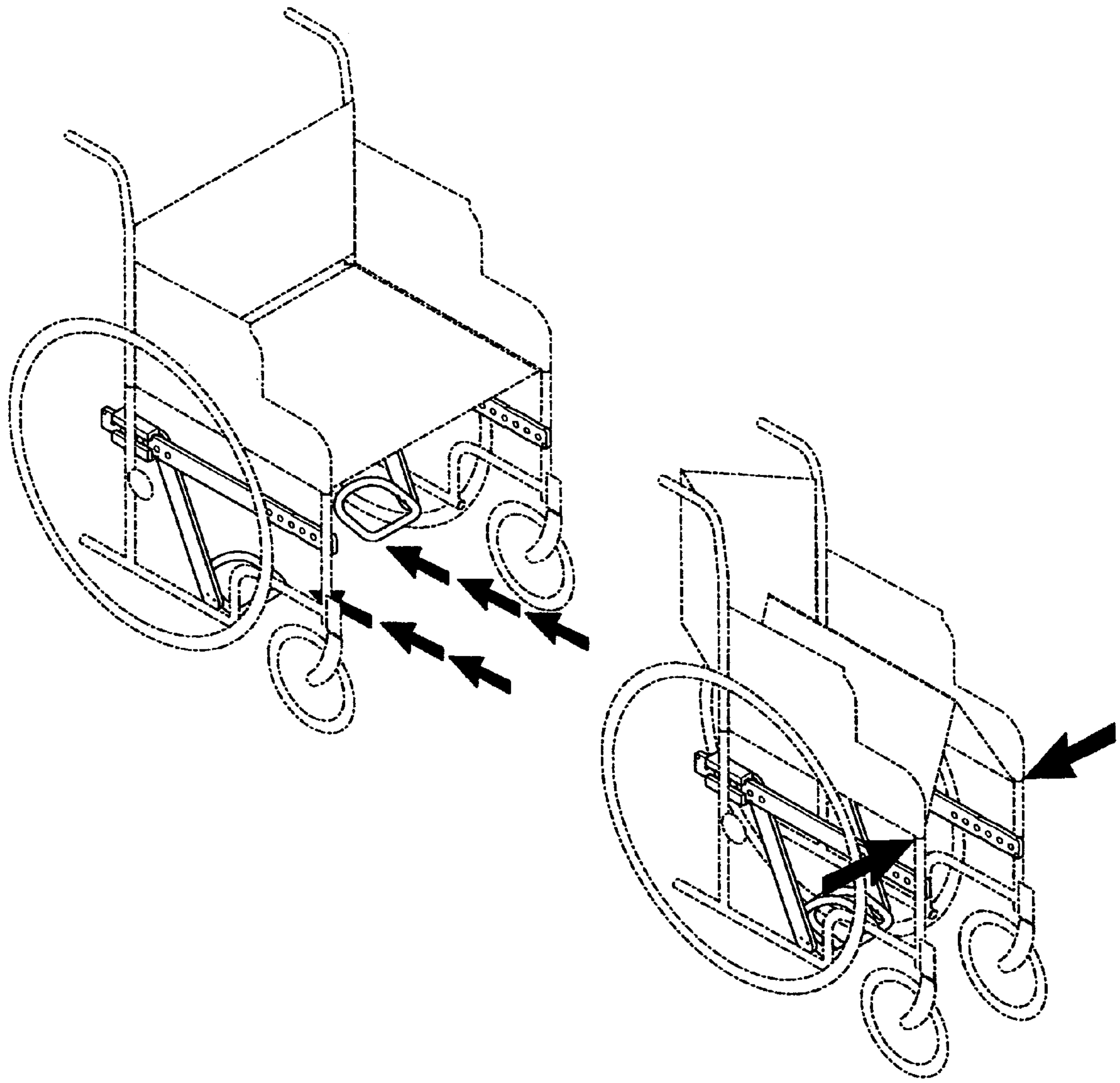

FIG. 1—OUTER RAIL AND CLAMPS
FIG. 2—FOOTREST ASSEMBLY
FIG. 3—FOOTREST INSTALLATION
FIG. 4—EXTEND RETRACT
FIG. 5—LOCK NOTCH
FIG. 6—DETAILED DESCRIPTION
FIG. 7—WHEELCHAIR FOLDED

DETAILED DESCRIPTION OF THE PREFERRED EMBODIMENT

Referring now to the drawings there is illustrated in FIG. 6 a wheelchair. The wheelchair comprises a pair of spaced apart side frames (15). The side frames (15) each includes an upper tube (16), a lower tube (17), a front tube (18), and a rear tube (19). These tubes are triangulated to form substantially rectangular shaped side frames.

Figure 8:
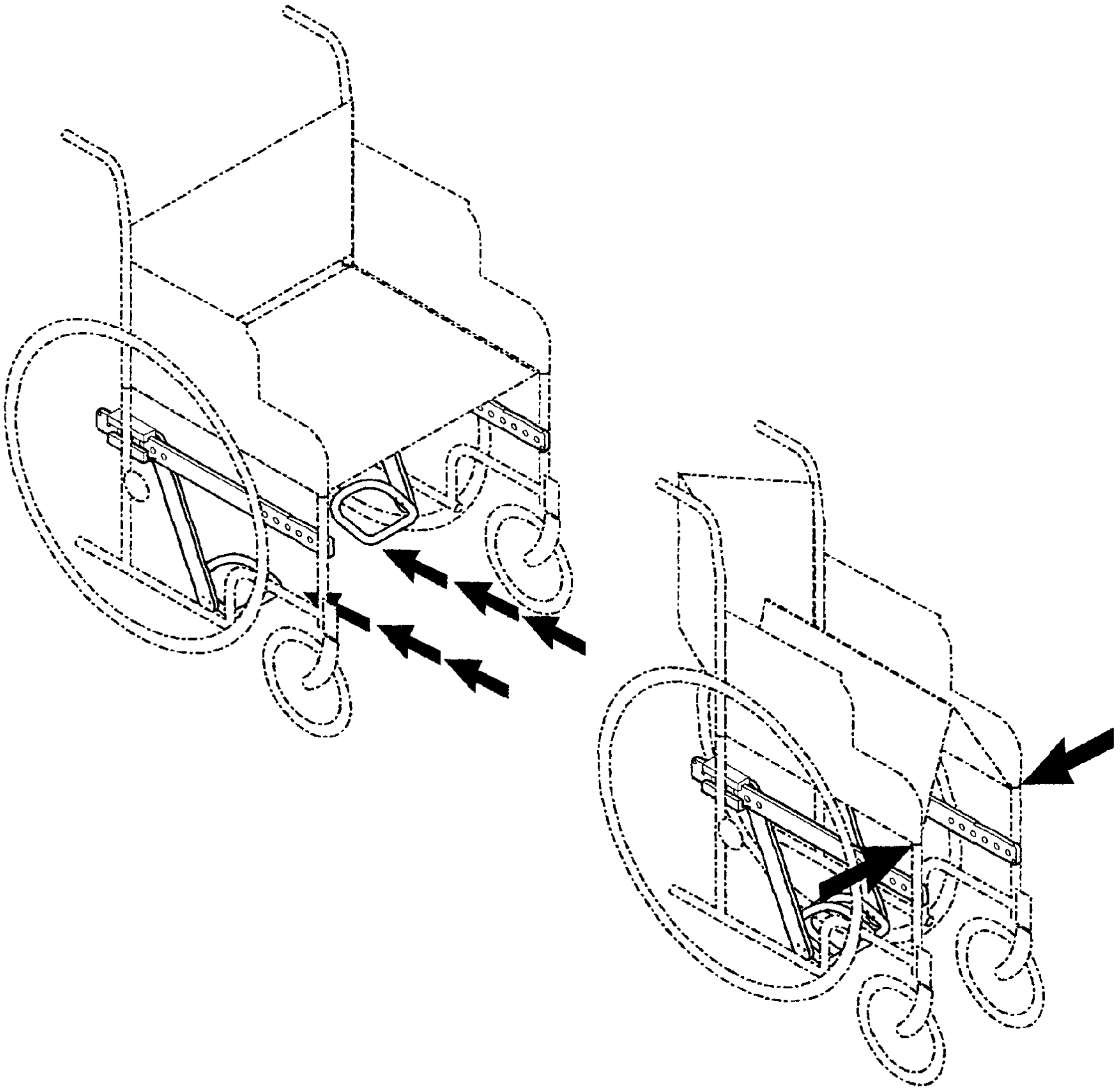

The side frames (15) are joined together by cross tubes (20). Lower ends of the cross tubes (20) are pivotally connected to the lower tubes (17) of the side frames (15). Upper portions of the cross tubes (20) are movably connected relative to the upper tubes (16) by transverse braces (not shown). The cross tubes (20) are foldable to permit the wheelchair to be folded into a compact form. The wheelchair is foldable into a compact form to permit the wheelchair to be easily transported and stored. FIG. 8.

Upper ends of the cross tubes (20) are connected to seat tubes (21). The seat tubes (21) are adapted to be supported by upper tubes (16) of corresponding side frames (15). The upper tubes (16) can be provided with couplings, such as saddles (not shown), for supporting the seat tubes (21) relative to the upper tubes (16). A sling (22) extends substantially horizontally between the seat tubes (21). The sling (22) forms a seat for supporting a wheelchair occupant.

Seat back tubes (23) are inserted in the rear tubes (19) of the side frames (15). A canvas seat back (24) extends substantially vertically between the seat back tubes (23). Upper ends of the seat back tubes (23) are provided with attendant handles (25) to aid an attendant in maneuvering the wheelchair.

As shown in the drawings, the upper tubes (16) can be adapted to support armrest assemblies (26). The armrest assembly's (26) can be comprised of armrest tubes (shown but not referenced) supporting armrests (27) and side guards (28). The armrests (27) are sufficiently low enough to permit a wheelchair occupant to gain access to rear wheels (29), which will be described herein below. The side guards (28) are provided to protect the wheelchair occupant's person or apparel from being caught in the spokes of the rear wheels (29).

Front caster wheels (30) support the front end of the wheelchair relative to a supporting surface. The front caster wheels (30) can be affixed to the wheelchair in any suitable manner. For example, the front caster wheels (30) can be provided with stems (not shown) that are adapted to be inserted into lower open ends of the front tubes (18) of the side frames (15). Bearings (also not shown) can be provided in an annular space between the stems and front tubes (18). The stems are adapted to rotate in the front tubes (18) to enable the wheelchair to be maneuvered.

Rear wheels (29) support the rear end of the wheelchair. The rear wheels (29) are adapted to be driven by the wheelchair occupant to propel and maneuver the wheelchair. The rear wheels (29) can be affixed to the wheelchair in any suitable manner. For example, axle plates (not shown) can be affixed to the side frames (15). The axle plates can be provided with apertures for receiving axles or axle tubes, which, in turn, are adapted to receive axles. The axles support the rear wheels (29).

It can be desirable to lock the rear wheels (29) in a substantially fixed position to prevent the wheelchair from moving. Locks, such as the wheel locks (31), can be provided for locking the rear wheels (29) in place. The wheel locks (31) can be attached to the side frames (15) adjacent to the periphery of the rear wheels (29). The wheel locks (31) include levers and contact members (shown but not referenced).

The wheel lock levers are displaceable to a locked position wherein contact members are caused to engage the rear wheels (29). To unlock the rear wheels (29), the wheel lock levers are displaceable to an unlocked position.

It is standard to have removable footrest assemblies extending from the front of the wheelchair (not shown). While not conventional, this invention embodies a type of footrest assembly that will be explained.

In accordance with this invention, footrest assembly's (32) are provided. The footrest assembly's (32) are mounted to permit forward and rearward movement. As shown in FIG. 5, the footrest assembly (32) can be moved to a first an extended position in front of the wheelchair, where it is closely adjacent to front tube (18) and aligned with the side frame 15. In this position, a wheelchair occupant deploys the footrest assembly (32) for use.

When not in use, the footrest assembly (32) can be moved to a second position beneath the wheelchair seat sling (22). See FIG. 4. In this position, the footrest assembly (32) is stored to provide the wheelchair occupant with increased access to and from the wheelchair. In addition it permits the wheelchair occupant to propel themselves with their feet. The footrest assembly (32) has a minimum number of components and it can be easily operated and manipulated with relatively limited manual dexterity.

Mounting of the Feet First footrest is accomplished as follows. Outer rail (2) is fastened to wheelchair vertical front post (18) and vertical rear post (19) of wheelchair side frame (15) with inner clamp (3) and outer clamp (7). FIG. 6.

After the outer rail (2) is installed, the footrest carriage (12) can be slid over the outer rail (2). Once installed, travel of the footrest carriage (12), is limited by front and rear screws (13). This permits the footrest assembly (32) to be easily extended to the front, or retracted to the rear. In order to move the footrest over the front caster wheel (30) the footrest arm (9) can be raised to clear the front caster wheel. When the footrest assembly (32) is fully extended the carriage (12) drops into a lock notch (33) to lock the footrest assembly (32) in place. To retract, the footrest carriage (12) must be raised out of the lock notch (33). FIG. 5.

The footrest assembly (32) is subjected to considerable loading at various times. Accordingly, the pivotal joint between the footrest arm (9) and the carriage (12) must be of sufficient strength to withstand various types of loads. The carriage (12), the outer rail (2), the footrest arm (9) and the footrest (10) are fabricated from materials that have high strength. Many metals are suitable for this use.

Operation of the footrest assembly (32) and the lock notch (33) now can be described. When the footrest assembly (32) is fully extended, the carriage (12) slides over and drops into a lock notch (33) at the front of the outer rail (2) locking it into place. In order to retract the footrest assembly (32), the carriage (12) must be raised out of the lock notch (33) and the carriage assembly (32) and retracted fully rearward to the stowed position. FIG. 5. In accordance with the provisions of the patent statutes, the principle and mode of operation of this invention have been explained and illustrated in its preferred embodiment. However, it must be understood that this invention can be practiced otherwise than as specifically explained and illustrated without departing from its spirit or scope.

What is claimed is:

1. A device for supporting a wheelchair occupant's feet available for use when needed stored under wheelchair seat so as to not interfere with wheelchair occupant's feet when not needed comprising of two footrest assemblies; two outer rails; two clamping means for attaching said outer rails to wheelchair side frames of various sizes wherein said carriages drop into lock notches on said outer rails when said footrest assemblies are fully extended locking said footrest assemblies in place.

2. A device according to claim 1 wherein footrest assembly is comprised of a footrest arm and a footrest and a carriage and associated mounting hardware.

3. A device according to claim 2 wherein said footrest arm connects said footrest to said carriage and can be pivoted upward to permit retraction and extension of said footrest without interference with front caster wheel.

4. A device according to claim 2 wherein said carriage conveys said footrest assemblies along said outer rails all the way back under wheelchair seat to the retracted position when not in use and along outer rails all the way forward to the extended position for use.

5. A device according to claim 4 wherein said carriage will stay locked in place until said carriage is raised out of the lock notch.

6. A device according to claim 1 wherein said outer rails include a lock notch to allow said carriage to lock in place for use when extended all the way forward.

7. A device according to claim 6 wherein said outer rails including mounting holes to allow said device for supporting a wheelchair occupant's feet to be attached to wheelchair side frames of various sizes.

8. A device according to claim 1 wherein said clamping means for attaching said outer rails to wheelchair side frames of various sizes include slotted holes that allow said device for supporting a wheelchair occupant's feet to fit wheelchair side frames of various sizes.

9. A device according to claim 1 will allow wheelchair to be folded.

10. A device according to claim 9 will allow rear wheels; front wheels; brakes; etc; to function normally.

* * * * *